United States Patent [19]

Werner et al.

[11] Patent Number: 4,525,987
[45] Date of Patent: Jul. 2, 1985

[54] AGRICULTURAL MACHINE

[75] Inventors: Anton Werner, Saverne; Jean-Paul Gantzer, Lutzelbourg, both of France

[73] Assignee: Kubn, S.A., Saverne, France

[21] Appl. No.: 601,304

[22] Filed: Apr. 17, 1984

[30] Foreign Application Priority Data

May 3, 1983 [FR] France ............................... 83 07481

[51] Int. Cl.³ ...................... A01D 69/00; F16H 37/00
[52] U.S. Cl. ......................................... 56/15.2; 56/2; 74/15.2
[58] Field of Search ................... 56/2, 15.2; 74/15.2, 74/606 R, 417, 825

[56] References Cited

U.S. PATENT DOCUMENTS

| | | | |
|---|---|---|---|
| 2,975,643 | 3/1961 | Ferguson | 74/15.2 |
| 3,389,609 | 6/1968 | Luscombe | 74/15.2 |
| 3,513,712 | 5/1970 | Zajichek et al. | 74/15.2 |
| 3,991,629 | 11/1976 | Dearnley | 74/15.2 |

*Primary Examiner*—Gene Mancene
*Assistant Examiner*—David I. Tarnoff
*Attorney, Agent, or Firm*—Ernest F. Marmorek

[57] ABSTRACT

An agricultural machine to be pulled by a tractor and having working tools driven by outer driving sources comprises a chassis arranged to support the working tools, a beam unit arranged for connecting the chassis with a tractor and including a first beam and a second beam, a transmission including a first portion and a second portion turnable relative to one another and arranged so that the first portion is connected with the first beam turnable relative to one another about an upward axis of turning of the portions whereas the second portion is fixedly connected with the second beam, a locking element arranged to lock the rotation between the first portion and the first beam, and a driving device arranged in the transmission and including two input shafts located in the first portion and receiving the movement from one driving source, an output shaft located in the second portion and adapted to transmit movement to the working tools at approximately the same speed independently of the input shafts which receives the movement, and intermediate driving element interconnecting the two input shafts and the output shaft, the working position of the input shaft which receives the movement of one outer driving source is determined by the locking element which locks the rotation between the first portion and the first beam.

13 Claims, 5 Drawing Figures

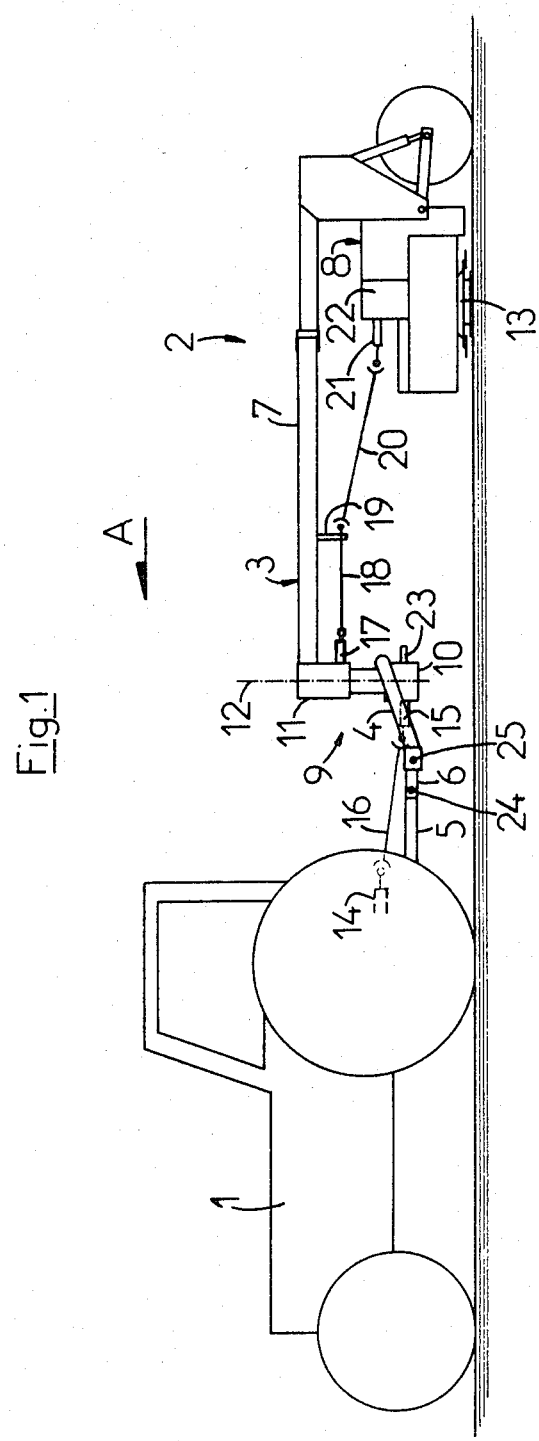

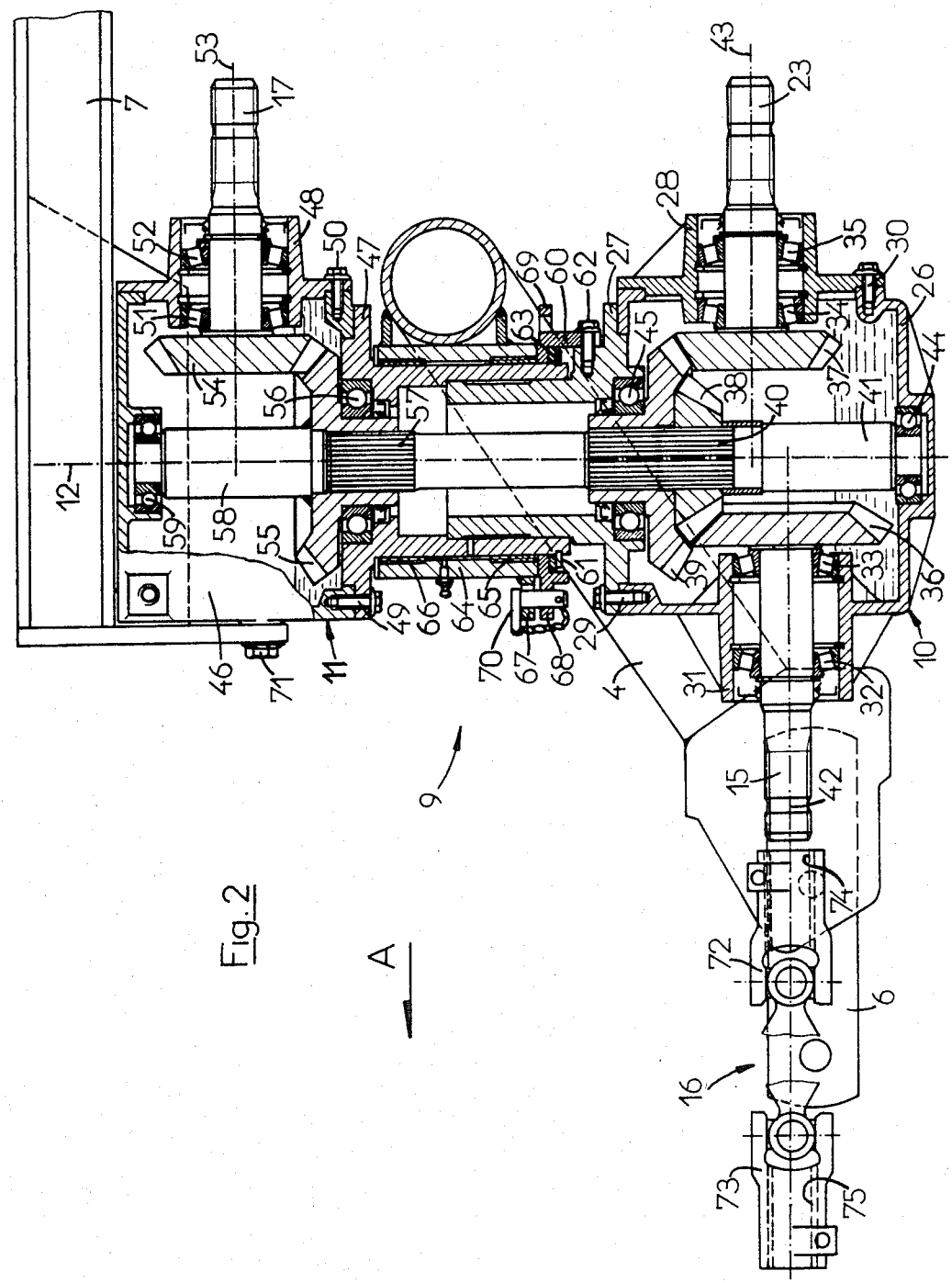

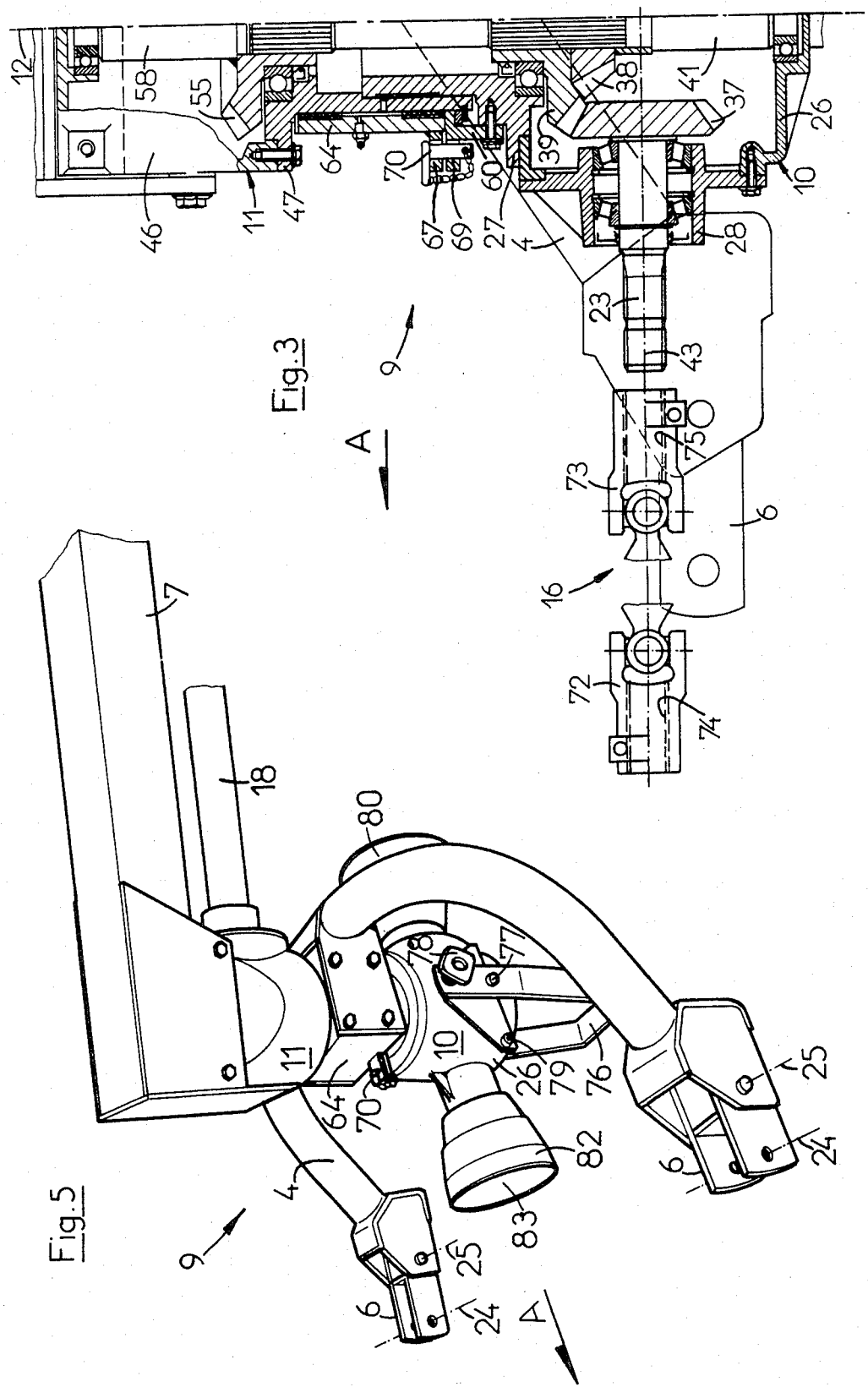

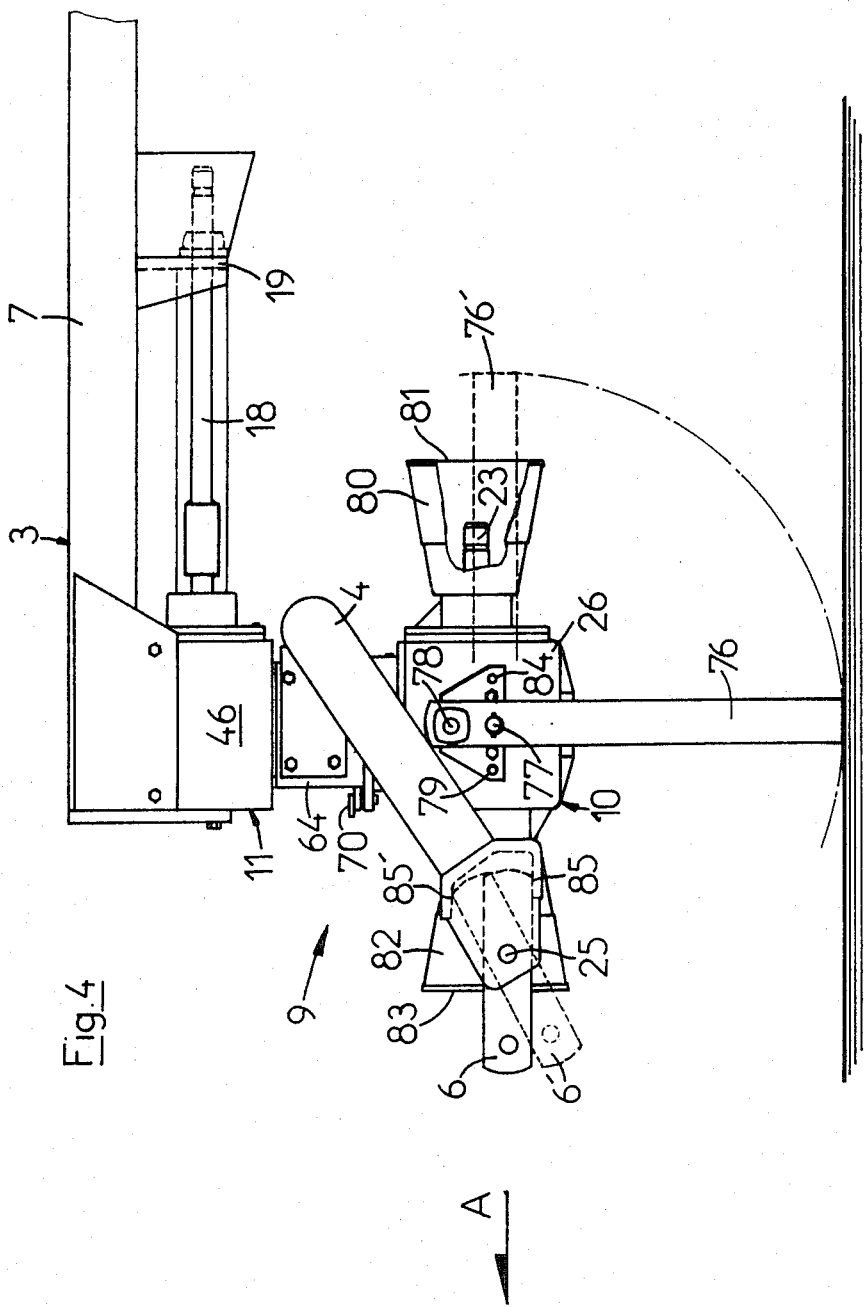

AGRICULTURAL MACHINE

BACKGROUND OF THE INVENTION

The present invention relates to an agricultural machine which is to be pulled by a tractor and has tools driven by an outer driving source, such as a driving force of the tractor with interposition of a transmission.

Agricultural machines of this type are known in the art. In a known machine the transmission has two portions turnable relative to one another about an upwardly directed axis. The first portion of the transmission is connected with a first beam which is linked to the tractor, whereas the second portion of the transmission is connected with a second beam which is linked to the machine itself, and an input shaft is supported by the first portion. With such a machine it is possible to work on turns without lowering the speed of the driving force or cutting its rotation, because the transmission shaft with universal joints which connects the driving force to the input shaft is not subjected to any overloading. This machine, however, has the inconvenience in that it cannot be driven independently of the driving force turning at different speeds, without changing the speed of the organs of the machine.

SUMMARY OF THE INVENTION

Accordingly, it is an object of the present invention to provide an agricultural machine which avoids the disadvantages of the prior art.

In keeping with these objects and with others which will become apparent hereinafter, one feature of the present invention resides, briefly stated, in an agricultural machine which has a chassis supporting working tools, a beam connecting the chassis to a tractor and having a first beam and a second beam, a transmission including a first portion and a second portion turnable relative to one another about an upwardly directed axis with the first portion connected to the first beam turnable relative to the latter about the upwardly directed axis and the second portion fixed to the second beam, locking means permitting to lock the rotation between the first portion and the first beam, and driving means located in the transmission and including two input shafts arranged in the first portion and adapted to receive the movement from one of the driving sources, an output shaft located in the second portion and adapted to transmit the movement to the working tools at approximately the same speed independently of the input shaft which receives the movement, and intermediate driving means interconnecting the input shafts and the output shaft, wherein the working position of the input shaft which must receive the movement of one of the driving sources is determined by the locking means which locks the rotation between the first portion and the first beam.

Advantageously, the two entry shafts occupy in the working position approximately the same position.

The transmission of the agricultural machine in accordance with the invention thus permits with simple means to drive the working tools of the machine at substantially the same speed independently of the speed with which the driving shaft of the tractor rotates, for example with 540 or 1000 revolutions per minute.

The fact that the input shafts occupy in the working position in which they cooperate with the transmission shaft with universal joints, approximately the same position is very advantageous. This permits to determine at the design stage of the machine, the best position of the input shaft keeping in mind the position of the driving shaft of the tractor which varies with the types of tractors, the best position so that the transmission shaft with universal joints operates in the best conditions. Because of the present invention, this position can be maintained independently of the working input shaft.

Moreover, this position is provided automatically as soon as the input shaft is placed into its working position, without supplemental manual manipulations by a user which avoids the danger of error.

Furthermore, the fact that positioning of the input shafts is effected by rotation about the axis of rotation of the two portions of the transmission relative to one another, permits a very compact construction of the transmission.

The compactness of the construction is also a result of the fact that the first beam and the first portion can turn relative to one another about the axis of turning of the two portions relative to one another, and that this rotation can be locked. This avoids in particular the use of a second first beam when the second input shaft must receive the movement.

This compactness of construction provides for numerous advantages related to the assembly, the cost and the weight, because it allows limitation of the number of necessary parts.

In accordance with another feature of the invention, the second portion has a hub with a longitudinal axis which conforms to the axis of turning of the first and second portions relative to one another, and the machine has also a connecting organ which connects the first portion with the first beam and is turnable on the hub about the longitudinal axis of the latter.

This arrangement is particularly advantageous because the hub is an element of the second integral portion of the second beam. The pulling force applied to the first beam is thus directly transmitted by the connecting organ to the second beam by the second portion. This permits to avoid too important stress of the intermediate driving devices which transmit the movement in the interior of the transmission.

In accordance with still additional feature of the invention, the transmission is provided with a crutch which supports the beam unit of the agricultural machine when the latter is detached from the tractor. Advantageously the crutch is mounted on the first portion. This arrangement provides for a great advantage in attaching of the machine to the tractor. All the weight supported by the crutch passes from the beam to the ground by means of the crutch.

Thus by separating the connecting organ linked to the first beam, and the first portion, the connecting organ and the first beam can be pivoted, about the hub of the second portion, to pull the first beam almost in front of the coupling of the tractor. This pivoting is very easy because it is not needed to overcome any friction force due to the weight supported by the crutch, because the latter does not budge when the first beam is pulled in front of the coupling.

In accordance with another characteristic of the invention, the crutch when lifted serves as a protection element of the input shaft which receives no movement.

The novel features of the invention are set forth in the appended claims; the invention itself, however, will be best understood from the following description of a preferred embodiment, which is accompanied by the following drawings.

BRIEF DESCRIPTION OF THE DRAWING

FIG. 1 is a view showing an agricultural machine in accordance with the present invention, coupled with a tractor;

FIG. 2 is a cross sectional view of a transmission of the agricultural machine of the present invention, when a first input shaft is in a working position;

FIG. 3 is a partial cross sectional view of the transmission of the agricultural machine according to the invention, when a second input shaft is in the working position;

FIG. 4 is a lateral view of the transmission according to the present invention; and FIG. 5 is a perspective view of the inventive transmission.

DESCRIPTION OF A PREFERRED EMBODIMENT

An agricultural aggregate is shown in FIG. 1 and includes a tractor 1 and an agricultural machine 2. The agricultural machine 2 has a beam unit 3 for its connection with the tractor 1. The beam unit 3 includes a first beam 4 which is preferably U-shaped in a horizontal view, and each branch of it can be connected with a lower arm 5 of a coupling of the tractor 1. The connection between each branch of the U-shaped beam 4 and the corresponding lower arm 5 can be performed by an oscillating support 6. The beam unit 3 also includes a second beam 7 which is connected with a body 8 of the agricultural machine 2. The first beam 4 and the second beam 7 are set at two different levels in a vertical plane and connected with one another by a transmission 9. The transmission 9 includes two portions 10 and 11 which can turn relative to one another about a substantially upright axis 12. The axis 12 is preferably substantially vertical. The first portion 10 of the transmission is connected with the first beam 4, whereas the second portion 11 of the same is connected with the second beam 7.

Organs 13 of the agricultural machine are driven in rotation from a driving shaft 14 of the tractor 1. The driving shaft 14 is connected with an input shaft 15 which is supported by the first portion 10 of the transmission 9. The connection is performed by a transmission shaft 16 with universal joints. The respective movement is transmitted in the interior of the transmission 9 from the input shaft 15 to an output shaft 17 by a mechanism which will be described hereinbelow. The output shaft 17 is connected with a shaft 18. The latter has one end cooperating with the output shaft 17, and another opposite end supported by a support 19 integral with the second beam 7. The shaft 18 is coupled with a second transmission shaft 20 with universal joints, which cooperates with an input shaft 21 of a driving frame 22 provided on the body 8 of the agricultural machine 2. The first portion 10 of the transmission 9 also includes a second input shaft 23 whose functions will be explained hereinbelow.

As mentioned above, the first portion 10 of the transmission is linked with the first beam 4, whereas the second portion 11 of the same is linked with the second beam 7. Thus, as the first portion 10 and the second portion 11 can turn relative to one another, the first beam 4 and the second beam 7 can equally turn relative to one another. As also mentioned hereinabove, the first beam 4 is linked with the lower arms 5 of the coupling of the tractor by the oscillating supports 6. The oscillating supports 6 are respectively connected with the lower arms 5 and the first beam 4 by joints 24 and 25.

When the agricultural machine is designed as described hereinabove, it possesses several degrees of freedom relative to the tractor 1, including rotation about axis of the joint 24 and/or the joint 25 so that the agricultural machine can displace itself in a substantially vertical plane relative to the tractor 1, rotation about an axis parallel to the travelling direction A due to the joints 24 and 25 of the oscillating supports 6, rotation about the axis 12 in such a manner that the machine can displace itself in a horizontal plane relative to the tractor 1.

The first two rotations have only a limited amplitude and allow the agricultural machine 2 to adapt itself perfectly to irregularities of the terrain, independently of the tractor 1. This arrangement also provides for more security to the aggregate of the tractor 1- agricultural machine 2. If the weight of the agricultural machine 2 is relatively big and the terrain is very rough, there is less risk that the machine 2 will cause the overthrow of the tractor 1.

The third rotation which permits turning can have a large width, or substantially 90° or more. However, taking into consideration the particular arrangement of the transmission device 9, the transmission shaft 16 which links the driving shaft 14 with the inputs shafts 15 or 23 of the first portion 10 is not subjected to any stress.

The transmission 9 is shown in cross section in FIG. 2. The first portion 10 has a frame 26. A first hub 27 and a first flange bearing 28 are mounted on the first frame 26 by means of screws 29 and 30, only one of which is shown in FIG. 2. The longitudinal axis of the first hub 27 corresponds to the axis 12. The first frame 26 also includes a bearing 31 which serves for guiding the rotation and maintaining the translation of the first input shaft 15 with the aid of rolls 32 and 33. The first flange bearing 28 serves for guiding the rotation and maintaining the translation of the second input shaft 23 with the aid of rolls 34 and 35. Mounting of the rolls 32, 33, 34, 35 is within the reach of a person skilled in the art. The ends of the input shafts 15 and 23 which extend into the interior of the first frame 26 are provided with conical wheels 36 and 37, respectively. The conical wheel 36 meshes with a conical wheel 38, whereas the conical wheel 37 meshes with a conical wheel 39. The conical wheels 38 and 39 are connected with the aid of grooves 40 with an intermediate shaft 41. The intermediate shaft 41 has a longitudinal axis which coincides with the axis 12 of turning of the portions 10 and 11 relative to one another. The longitudinal axis of the intermediate shaft 41 is perpendicular to an axis of rotation 42 of the first input shaft 15 and to an axis of rotation 43 of the second input shaft 23. The intermediate shaft 41 is guided in rotation in the first frame 26 by means of rolls 44 and 45.

The second portion 11 includes a second frame 46. A second hub 47 and a second flange bearing 48 are mounted on the second frame 46 by means of screws 49 and 50, only one of which is shown in FIG. 2. The longitudinal axis of the second hub 47 is in alignment with the axis 12.

The second flange bearing 48 serves for guiding the rotation and maintaining the translation of the output shaft 17 by means of the rolls 51 and 52. The mounting of these rolls is within the reach of a person skilled in the art. An axis of rotation 53 of the output shaft 17 is perpendicular to the longitudinal axis of the intermediate shaft 41 and parallel to the axes 42 and 43. The end of the output shaft 17, which extends into the interior of the second frame 46 is provided with a conical wheel 54 which meshes with a conical wheel 55 guided in rotation in the second hub 47 by means of a roll 56. The conical wheel 55 is connected by grooves 57 with the intermediate shaft 41 for joint rotation therewith. The conical wheel 55 is also rigidly connected with the end of a shaft 58, the other end of which is guided in rotation in the second frame 46 by means of a roll 59. The longitudinal axis of the shaft 58 is an extension of the longitudinal axis of the intermediate shaft 41.

The first hub 27 is partially centered in the interior of the second hub 47 so that the two hubs 27 and 47 can turn relative to one another about the axis 12. The first hub 27 is connected in translation to the second hub by a crown 60 and a locking ring 61. The crown 60 is connected with the first hub 27 by screws 62, only one of which is shown. The crown 60 integral with the first hub 27 turns relative to the locking ring 61 integral with the second hub 47, and a disc 63 is interposed between the crown 60 and the locking ring 61.

A support bearing 64 is centered on the exterior of the second hub 47 by two bushes 65 and 66 so that said support bearing can turn relative to the hub 47. The longitudinal axis of the support bearing 64 corresponds to the axis 12. The rotation between the support bearing 64 and the first hub can be locked. For this purpose the bearing support 64 is provided with an eye 67 having a hole, the crown 60 has two eyes 68 and 69 also having a hole, and a pin 70 extends through the eye 67 and one of the eyes 68 or 69. The bearing support is rigidly connected with the first beam 4 by screws shown in FIG. 5 and serves as a connecting organ between the first beam 4 and the first portion 10. The second frame 46 is connected with the second beam 7 by screws 71, only one of which is shown in FIG. 2. The arrangement of the support bearing 64 on the second hub 47 is particularly advantageous, since the traction force applied to the first beam 4 passes directly to the second beam 7 through the second portion 11. If the first beam 4 were linked to the first portion 10, the traction force would be transmitted from the first hub 27 to the second hub 47, which would provoke stress to the intermediate shaft 41 taking into consideration the functional play between the hubs 27 and 47.

The output shafts 15 and 23 have advantageously different profiles and their longitudinal axes 42 and 43 form approximately an extension of one another. The transmission shaft 16 has two jaws 72 and 73 provided with a bore 74 and a bore 75, respectively. The profile of the bore 74 is complementary to the profile of the first input shaft 15, whereas the profile of the bore 75 is complementary to the profile of the second input shaft 23.

The input shafts 15 and 23 are arranged to be driven at different rotation speeds, while the output shaft 17 has substantially a constant rotation speed, and the intermediate shaft 41 has also a substantially constant rotation speed. The transmission ratio of the conical couplings 36 and 38 and of the conical couplings 37 and 39 must have adequate values for obtaining this result.

Most tractors have a driving shaft which rotates with a speed of 540 revolutions per minute or 1000 revolutions per minute. The driving shaft with 540 revolutions per minute has a profile with 6 straight grooves, whereas the shaft with 1000 revolutions per minute has a profile with 21 involute grooves. For this purpose, the first input shaft 15 to be driven with 540 revolutions per minute has a profile with 21 involute grooves, whereas the second input shaft to be driven with 1000 revolutions per minute has a profile with 6 straight grooves.

The bore 74 of the jaw 72 to be coupled with the first input shaft 15 has 21 involute grooves, whereas the bore 75 of the jaw 73 to be coupled with the second input shaft 23 has 6 straight grooves. If the output shaft 17 rotates at about 1000 revolutions per minute, it is therefore deduced that the transmission ratio of the conical coupling 54,55 is approximately equal to the transmission ratio of the conical coupling 37,39. In the case of the rotation speeds used in this example, a reduced size of the conical couplings 36,38 and 37,39 is obtained when the intermediate shaft 41 makes about 740 revolutions per minute. With this arrangement of the transmission, it is possible to operate at full working speed when the agricultural machine performs turns, without risking any damage to the transmission shaft 16. The unit formed by the first portion 10, the crown 60, the support bearing 64, the first beam 4 and the transmission shaft 16 remains always in alignment with the longitudinal axis of the tractor 1, as seen in plan view. When a turning is performed, the whole unit defined above turns about the second hub 47, that means about the axis 12.

In the case of FIG. 2, the transmission 9 of the agricultural machine 2 is arranged to be driven by the tractor 1 whose driving shaft 14 makes 540 revolutions per minute and has a profile with 6 straight grooves. This is possible because the bore 75 has also 6 straight grooves.

If the agricultural machine 2 is to be pulled by the tractor 1 with the driving shaft 14 which makes 1000 revolutions per minute and has a profile with 21 involute grooves, the transmission 9 must be arranged as shown in FIG. 3, so that the second input shaft 23 is located in front to be coupled with the transmission shaft 16 which is returned so that the jaw 73 cooperates with the second input shaft 23 and the jaw 72 cooperates with the driving shaft 14 of the tractor 1. To carry out this, the transmission shaft 16 is switched, the support bearing 64 and the crown 60 are disconnected by withdrawing the pin 70 of the eyes 67 and 68, the whole first portion 10 is turned about the axis 12 by holding in place the support bearing 64 and the first beam 4 until the eye 69 faces the eye 67, the support bearing 64 and the crown 60 are again connected by the pin 70, the transmission shaft 16 is branched in such a way that the jaw 72 cooperates with the driving shaft 14 of the tractor 1 and the jaw 73 cooperates with the second input shaft 23. This is possible because the bore 74 of the jaw 72 has a profile with 21 involute grooves and the bore 75 of the jaw 73 has 6 straight grooves. It is evident that this adaptation of the transmission to the driving shaft 14 of the tractor 1 is carried out without any equipment.

The input shafts 15 and 23 occupy in working condition in which they cooperate with the transmission shaft 16, approximately the same position. This is especially interesting since it permits determination at the design stage/of a best position of the input shaft with consideration of the position of the driving shaft of the tractors which varies in function with tractors of different types, so as to guarantee that the transmission shaft 16 always operates under best conditions. In accordance with the invention, this position can be approximately maintained no matter which input shaft 15 or 23 operates.

Moreover, this position is established automatically as soon as the input shaft 15 or 23 is put in operating position, without additional manual operations to be made by a user thus avoiding any risk of error.

Moreover, the fact that the positioning for operation of the input shafts 15 or 23 is performed by rotation about the axis 12, and that the first portion 10 and the first beam 4 can be disconnected and turned relative to one another about this axis 12, allows a very compact construction of the transmission 9 providing many advantages in the sense of assembly, cost and weight of it.

FIG. 4 is a lateral view of the transmission 9. The advantage of the shaft 18 which is supported by the output shaft 17 and the support 19 is the shortening of the transmission shaft with the universal joints 20, so that the amplitude of vibrations to which this shaft 20 is subjected when it rotates remains weak so as not to damage this shaft. As can be seen from FIG. 1, the length of the shaft 18 is preferably substantially the same as the length of the shaft 20. If the transmission shaft 20 were directly branched between the output shaft 17 and the input shaft 21, the amplitude of vibrations would be such that, taking into consideration the great length of this shaft, it would quickly cause its breaking provoking a bodily accident, if a person remained in the vicinity of the machine.

FIG. 4 also shows that the transmission 9 supports a crutch 76. The crutch 76 is connected with the first frame 26 by an articulated axle 77 and a screw 78. As shown in FIG. 4, the agricultural machine is uncoupled from the tractor and the front end of its beam 3 rests on the ground with the aid of the crutch 76. When the machine is coupled to the lower arms 5 of the tractor, the crutch 76 is pivoted to a rest position. For doing this, the screw 78 is unscrewed, the crutch 76 is pivoted for instance to its rest position 76' and the crutch is locked in this position by screwing the screw 78 into a hole 79 provided for this purpose in the first frame 26. As can be seen from FIG. 5, the crutch 76 is U-shaped. With this shape the crutch 76 can serve advantageously to protect additionally the input shafts 15 or 23 which does not operate. In FIG. 4 the second input shaft 23 does not work. Nevertheless this shaft turns as can be seen in FIG. 2. Thus in order to prevent any risk of accident, the input shaft 23 is surrounded by a cup 80 which is open at its end 81. This opening is partially blocked by the crutch 76 so as to make access to the input shaft 23 difficult or even impossible. The first input shaft 15 is also surrounded by a cup 82 with an opening 83 which is also partially blocked by the crutch 76 when the shaft does not operate. To provide this, the crutch 76 is simply pivoted against the input shaft 15 and locked in this position by screwing the screw 78 into a hole 84 provided for this purpose in the first frame 26.

As mentioned above, the crutch 76 supports the front of the beam 3. This provides for a great advantage in coupling the agricultural machine 2 to the tractor 1. All the weight supported by the crutch 76 passes from the beam 3 into the ground through the second portion 11, the first portion 10 and the crutch 76. By neutralizing the pin 70 the bearing support 64 and the first beam 4 are separated from the first portion 10, namely from the first frame 26 so that the whole unit bearing support 64-first beam 4 can be turned about the second hub 47 to guide the oscillating supports 6 of the first beam 4 for facing the lower arms 5 of the coupling of the tractor 1. This rotation is very easy since it does not have to overcome any frictional force due to the weight supported by the crutch 76, because the latter does not move when the first beam is moved in front of the coupling of the tractor 1.

FIG. 4 also shows that the rotation of the oscillating supports 6 about the axes 25 is limited by two abutments 85 and 85' so that the oscillating supports 6 can take any position between the extreme positions 6 and 6'.

The transmission described hereinabove permits driving the organs of the machine 2 indiscriminately from tractors with driving shafts which make 540 revolutions per minute and have a profile with 6 straight grooves, or from tractors with driving shafts which make 1000 revolutions per minute and have a profile with 21 involute grooves. There are also tractors with high power with driving shafts which make 1000 revolutions per minute, but with a profile having 6 straight grooves and a greater diameter than the preceding shafts with 6 grooves or with 20 involute grooves. It is possible that a transmission can be made with the input shafts having such profiles, wherein the transmission ratio of the couplings provided in the transmission will be consequently determined.

Moreover, it is also possible that the input shafts 15 and 23 can have the same profile. In this case it is necessary to change the transmission shaft 16 in dependence with the driving shaft 14 of the tractor 1.

On the other hand, it is possible that all combinations between the different profiles are possible. It is also possible that the profiles can be different from those described hereinabove. Moreover, it is also possible that means for driving located in the transmission can be different than those described. The conical couplings 54,55, the output shaft 17, the shaft 18, the transmission shaft 20 and the input shaft 21 can be replaced by a pulley located at the upper extremity of the intermediate shaft 41, a belt and a pulley situated at the inlet of the driving frame 22 of the machine.

The invention is not limited to the details shown since various modifications and structural changes are possible without departing in any way from the spirit of the present invention.

What is desired to be protected by Letters Patent is set forth in particular in the appended claims.

What is claimed is:

1. An agricultural machine to be pulled by a tractor and having working tools driven by outer driving sources, the machine comprising
    a chassis arranged to support working tools;
    a beam unit arranged for connecting said chassis to a tractor and including a first beam and a second beam;
    a transmission including a first portion and a second portion turnable relative to one another about an upwardly directed axis, said first portion being connected with said first beam so that it can turn relative to one another about said upwardly directed axis, said second portion being fixed to said second beam;
    locking means arranged to lock the rotation between said first portion and said first beam; and
    driving means arranged in said transmission and including two input shafts located in said first portion and adapted to receive the movement from one outer driving source, an output shaft located in said second portion and adapted to transmit movement to the working tools at approximately the same speed independently of said input shaft which receives the movement, and intermediate driving means interconnecting said two input shafts and said output shaft, the working position of the input shaft which receives the movement of one outer driving source being determined by said locking means which locks the rotation between said first portion and said first beam.

2. An agricultural machine as defined in claim 1, wherein said two input shafts are arranged so that in said working position they occupy approximately the same position.

3. An agricultural machine as defined in claim 1, wherein said second portion has a hub with a longitudinal axis conformable with said axis of turning of said first portion and said second portion relative to one another; and further comprising a connecting organ which connects said first portion and said first beam and is turnable on said hub about said longitudinal axis.

4. An agricultural machine as defined in claim 3, wherein said first portion includes a hub with a longitudinal axis conformable with said axis of turning of said first and second portions relative to one another, said hub of said first portion turning in said hub of said second portion, said connecting organ arranged to connect said first portion and said first beam being turnable on the exterior of said hub of said second portion.

5. An agricultural machine as defined in claim 1, wherein said first portion includes two opposite surfaces, said two input shafts being each supported by a respective one of said opposite surfaces.

6. An agricultural machine as defined in claim 5, wherein said two input shafts are arranged so that they approximately form an extension of one another.

7. An agricultural machine as defined in claim 1, wherein said intermediate driving means includes a first and a second conical couplings located in said first portion and each having first wheel and second wheel, and an intermediate shaft with a longitudinal axis corresponding to said axis of turning of said first and second portions relative to one another, said intermediate shaft being connected rotationally to said second wheels of said first and second conical coupling, whereas said two input shafts are connected rotationally one to said first wheel of said first conical coupling and the other to said first wheel of said second conical coupling.

8. An agricultural machine as defined in claim 7, wherein said second wheels of said first and second conical couplings are located in an upper part of said first portion.

9. An agricultural machine as defined in claim 7, wherein said intermediate shaft is turnable approximately with the same speed independently of said input shaft which receives the movement.

10. An agricultural machine as defined in claim 1; and further comprising a crutch mounted on said first portion of said transmission.

11. An agricultural machine as defined in claim 10, wherein said crutch is liftable and arranged so as to protect in its lifted position the input shaft which does not receive the movement.

12. An agricultural machine as defined in claim 1; and further comprising transmission means extending between said output shaft and the working tools and including two shafts one of which is supported by said second beam.

13. An agricultural machine as defined in claim 12, wherein said two shafts have approximately identical lengths.

* * * * *

UNITED STATES PATENT AND TRADEMARK OFFICE
CERTIFICATE OF CORRECTION

PATENT NO.   :   4,525,987
DATED        :   July 2, 1985
INVENTOR(S)  :   Anton Werner, et al.

It is certified that error appears in the above-identified patent and that said Letters Patent is hereby corrected as shown below:

On the title page, Item (73) should read:
--(73) Assignee: Kuhn, S.A., Saverne, France--.

Signed and Sealed this

First Day of October 1985

[SEAL]

Attest:

Attesting Officer

DONALD J. QUIGG

Commissioner of Patents and
Trademarks—Designate